(12) United States Patent
Lange

(10) Patent No.: US 8,682,759 B2
(45) Date of Patent: Mar. 25, 2014

(54) SYSTEM AND METHOD FOR DETERMINING AND BROKERING FUEL EMISSION OFFSETS

(76) Inventor: David Lange, Vancouver (CA)

( * ) Notice: Subject to any disclaimer, the term of this patent is extended or adjusted under 35 U.S.C. 154(b) by 574 days.

(21) Appl. No.: 12/196,904

(22) Filed: Aug. 22, 2008

(65) Prior Publication Data

US 2009/0055304 A1 Feb. 26, 2009

Related U.S. Application Data

(63) Continuation-in-part of application No. PCT/CA2007/000274, filed on Feb. 23, 2007.

(60) Provisional application No. 60/777,706, filed on Feb. 27, 2006.

(51) Int. Cl.
    *G06Q 40/00* (2012.01)
(52) U.S. Cl.
    USPC .................................. 705/35; 705/308
(58) Field of Classification Search
    USPC .................................. 705/35, 308
    See application file for complete search history.

(56) References Cited

U.S. PATENT DOCUMENTS

| 5,343,906 | A  * | 9/1994  | Tibbals, III ............... 141/83  |
| 7,141,321 | B2 * | 11/2006 | McArthur et al. .......... 429/443 |
| 2002/0110044 | A1 * | 8/2002 | Kanayama et al. .......... 366/8 |
| 2002/0132144 | A1 * | 9/2002 | McArthur et al. .......... 429/13 |
| 2003/0010399 | A1 * | 1/2003 | Friebe et al. .............. 141/98 |
| 2003/0065630 | A1 * | 4/2003 | Brown et al. ............. 705/413 |
| 2006/0235792 | A1 * | 10/2006 | Janes ....................... 705/40 |
| 2008/0168009 | A1 * | 7/2008 | Johnson .................... 705/413 |

* cited by examiner

*Primary Examiner* — Lalita M Hamilton
(74) *Attorney, Agent, or Firm* — Anderson Gorecki & Rouille LLP

(57) ABSTRACT

A brokering system and method for providing an incentive to end users of petroleum fueled vehicles to make use of retrofit kits for existing IC engines which permit the use of hydrogen blended with fossil fuels without technically invading or modifying the engine or its intended purpose or application. End users of retrofitted vehicles are provided with discounted fuel costs at authorized refueling stations. The end user's savings include: a) a reduction in refueling charges since the vehicl's reliance on fossil fuel (which is displaced by hydrogen in the engine), and b) by the purchase of methanol which can be set at a lower cost per calorific equivalent than a barrel of oil while also earning emission offsets to be exchanged by the owner of the retrofitted engine for cash. These emission offsets can then be sold to end users/creators of carbon credits.

28 Claims, 6 Drawing Sheets

SYSTEM AND METHOD FOR DETERMINING AND BROKERING FUEL EMISSION OFFSETS

CROSS-REFERENCE TO RELATED APPLICATIONS

This application is a Continuation In Part (CIP) of International Patent Application No. PCT/CA2007/000274, filed 23 Feb. 2007, and also claims priority to U.S. provisional application Ser. No. 60/777,706, filed Feb. 27, 2006, the content of each of which is hereby incorporated herein by reference. This application is also related to U.S. Pat. No. 7,290,504 B2, which issued on Nov. 6, 2007 from U.S. patent application Ser. No. 11/107,184, which was filed on Apr. 15, 2005, the content of which is hereby incorporated herein by reference.

FIELD OF THE INVENTION

This invention relates to marketing and promoting the use of hydrogen in internal combustion engines in general, and particularly relates to a system and method of brokering "cap and trade emission offsets" and/or offsets produced by a future tax on emissions (for example, a "carbon tax" or a "price on emissions"). The invention does this by encouraging the use of hydrogen in existing internal combustion engines. This invention also provides value added brokerage for any emissions offset technology that produces emission reductions.

BACKGROUND OF THE INVENTION

Concerted efforts are being made by governments and the automotive industry to reduce our dependence on fossil fuels and, in addition, to help reduce harmful emissions. Governments worldwide are attempting to move towards the use of cleaner fuels; for example, with the signing of the Kyoto Protocol. The Kyoto Protocol, is an international and legally binding agreement to reduce greenhouse gases emissions world wide, entered into force on 16 Feb. 2005. The Kyoto Protocol will bind ratifying nations to a system of emission offsets, with a cap being set for each nation. Under the proposed treaty, nations that emit less than their quota of greenhouse gases will be able to sell emission offsets to polluting nations.

Emissions trading will be used as an administrative approach to reduce the cost of pollution control by providing economic incentives for achieving emission reductions. In such a plan, a central authority (e.g., air pollution control district, state agency, or Federal agency) sets limits or "caps" on each pollutant. Groups that intend to exceed the limits may buy emission offsets from entities that are able to stay below their designated limits. This transfer is normally referred to as a trade. (In some emissions trading systems a portion of the traded credits are mandated to be retired. By retiring some of the credits the system achieves a net reduction in emissions, as well as cost reduction from each trade.) Most authorities agree that emissions trading is an effective strategy if properly designed and administered and if, in particular, emission trading directly results in reducing the consumption of fossil fuels.

The idea is that a central authority will grant an allowance to entities based upon a measure of their need or their previous pollution history. For example an allowance for greenhouse gas emissions (i.e., carbon dioxide) to a country might be based upon total population of the country or based on existing emissions of the country. An industrial facility might be granted a license for its current actual emissions. If a given country or facility does not need all of its allowance, it may offer it for sale to another organization that has insufficient allowances for its emissions production.

Unfortunately, the use of such emission offsets does not assist the automotive industry when it provides consumers with fuel efficient engines or vehicles which operate with alternative fuels, the sale of such vehicles being partly made in order to meet government fuel consumption guidelines. Also, because of regulatory requirements, research continues to reduce emissions of internal combustion (IC) engines, regardless of whether they are powered by conventional gasoline, diesel or much cleaner natural gas fuels. For the automotive industry, the research and design of such vehicles is costing billions of dollars in investment at a time when the lifecycle of automobiles has increased and sale of new vehicles has decreased.

Similarly emission offsets are not provided to end users or consumers of such fuel efficient or hybrid vehicles, even if the use and purchase of such vehicles means having to pay thousands of dollars toward vehicles which are untested (compared to 100 years of petroleum based internal combustion engines) and which may have limited performance and impact on reducing greenhouse effects.

On the other side of the supply equation, the oil and gas industry is today reaping record yearly profits even as the cost of a barrel of oil continues to increase. How can the oil and gas industry justify supporting the use of non-petroleum based products for mass consumption when so much revenue can be achieved from the status quo? Not only would it be inappropriate in such a competitive economy but it would be against the fiduciary duties of the management of such companies to move away from such a source of continuous and guaranteed revenue.

Similarly, although governments are trying to promote clean air and reduction or elimination of their countries' dependence on fossil fuels, most if not all governments have large tax revenues associated with consumers' reliance on fossil fuels.

Unless a viable commercial market for non-petroleum based products were to exist, the oil and gas industry will be reluctant to lower their operating profits for the benefit of clean air.

Similarly, consumers will be reluctant to embrace new technologies unless there is either a government incentive to do so via lower taxes or unless such technologies become more affordable and can guarantee an access to non-petroleum based fuels which must be as easy to obtain as gasoline and diesel fuels are today.

Much research is being directed to creating a hydrogen based economy. In particular, the automotive industry as indicated above is spending billions of dollars to create vehicles which can burn hydrogen as an on board fuel to power fuel cells, and recently renewed interest in powering IC engines.

Unfortunately, regardless of the industry's commitment to design and create such vehicles, the economics and consumer convenience of hydrogen fuel production and delivery have not been developed far enough to attract industry, government and finance to create a market for hydrogen fuel in today's fossil fuel economy.

A need therefore exists for a system and method of brokering the distribution of environmentally cleaner fuels, but particularly, enabling the creation of a hydrogen economy, which will attract industry, government, finance and consumers.

SUMMARY OF THE INVENTION

As described in applicant's co-pending U.S. patent application Ser. No. 11/107,184 filed Apr. 15, 2005, with today's heavy dependence on existing IC engines operating on fossil fuels such as gasoline and diesel, a transition to a hydrogen based economy can only be achieved if a) the cost of retrofitting an existing IC engine which displaces use of fossil type fuel is minimal or can be offset by appropriate financial incentives and b) a dependable and inexpensive zero emissions source of hydrogen is available to the average consumer.

The present invention achieves this by providing an additional incentive to the ownership of a fuel efficient vehicle and to end users of petroleum based vehicles who wish to modify their vehicles with retrofit kits or to demand new vehicles which will be designed to make use of hydrogen based fuels. Similarly, the present invention permits the profitable move from today's fossil-fuel-based economy towards a future hydrogen economy by encouraging the production of hydrogen as an affordable transport fuel which can amortize the invention and its hydrogen production, distribution and fueling infrastructure, which infrastructure will at once build consumer demand for new hydrogen vehicles as well as ever-cleaner sources of hydrogen fuel production.

The invention is accomplished by providing end users of such modified vehicles with discounted fuel costs at authorized refueling stations via a brokerage system able to provide economic incentives in exchange for the emissions offsets created by the operation of such modified vehicles.

An emission offset is an emission reduction from a source that is not limited by a "cap and trade" program. Permitting offsets encourages reductions beyond the scope of a cap and trade program, often in sectors where emissions are more difficult to track and report; for example, mobile sources such as vehicles.

Many quantification protocols are already approved by certain offset programs such as the Clean Development Mechanism, Alberta's Specified Gas Emitters Regulation, the California Climate Action Registry, the New South Wales Greenhouse Gas Abatement Scheme, France's Offset Program and the Regional Greenhouse Gas Initiative. While these programs are in effect for buildings, forestry, GHG capture, renewable energy, etc., it was never perceived that offsets could be created in existing and/or future IC engines before U.S. Pat. No. 7,290,504 B2 was issued, and this invention related directly to that patent now provides an emission offsets quantification protocol for IC engines.

End users also receive discounted fuel cost, which is derived from the purchase price of hydrogen or a hydrogen carrier such as alcohol (ethanol or methanol), which is converted to hydrogen in each end user's modified vehicle. The brokerage system provides certain advantages to the end user of the aforementioned retrofit kit or to those operating an environmentally friendly vehicle. In the case of vehicles with hydrogen retrofit kits, these advantages are two-fold: a) by saving on fueling charges since the vehicle's reliance on fossil fuel (which is displaced by hydrogen) is reduced and b), by the purchase of hydrogen or a hydrogen carrier, which can be set by a market to include emission offsets, at a lower cost per calorific equivalent than a barrel of oil. Similarly, although the end user is able to reduce his or her consumption of petroleum based fuels, the oil and gas industry continues to benefit from the sale of an additional fuel since for the immediate future, hydrogen or its carrier (i.e. methanol) continues to be derived initially from the petroleum industry. It is perceived that later on, the petroleum industry will diversify into other methods of hydrogen production such as electrolysis of water from clean electricity or hydrogen production from cellulosic plant waste.

For the purpose of the present invention, the sale of hydrogen (or alcohol as its carrier) is done at authorized fueling stations.

In its simplest embodiment, end users of fuel efficient vehicles are provided with a unique fueling authorization or validation card which is used to receive instantaneous credit, either in terms of currency or emission offsets or both as a result of the reduction of emissions from the use of more fuel efficient engines.

In a further embodiment, an engine sensor, is provided for capturing utilization information of an environmentally cleaner vehicle. With the information captured by the engine sensor, emissions offsets associated with the use of said environmentally cleaner vehicle can be derived.

In the preferred embodiment of the invention, end users of vehicles modified with a hydrogen retrofit kit are provided with a similar unique fueling authorization card which is used to permit the fueling of an alcohol based liquid fuel and also to receive additional credit, either in terms of currency or emission offsets or both as a result of the reduction of emissions from the use and conversion of the alcohol based liquid fuel into hydrogen for the retrofitted engine.

In another embodiment, an emissions trust is set up to enable the collection or accumulation of emission credits (i.e., purchase of the right to continue to pollute during a regulated time period) from which the end user can receive regular proceeds from the sale of emission offsets earned by the substitution of hydrogen for fossil fuels in IC engines. The emissions trust can also be accessed by energy or emissions credit brokers to enable producers of emission credits to buy emission offsets.

Other advantages and novel features of the present invention will become apparent from the detailed description of the invention.

BRIEF DESCRIPTION OF THE DRAWINGS

In order to impart full understanding of the manner in which this objective and others are attained in accordance with the present invention, preferred embodiments thereof will be described hereinafter with reference to the accompanying drawings, wherein:

FIG. 2b is a block diagram illustrating fueling components of a vehicle equipped with retrofit kit of FIG. 2a;

DETAILED DESCRIPTION OF THE PREFERRED EMBODIMENT

As indicated above, the substitution of fossil fuels for hydrogen cannot be accomplished economically unless there are incentives from government agencies (which have control over the tax structures for fuels), to all of the energy industry, the automotive industry and the end user, i.e. the consumer. Given the current lack of such incentives, the objective of promoting, using and supplying a source of hydrogen remains. With the use of the system and method of the present invention, brokering of emission offsets is provided to end users of fossil fuels while providing an incentive to make use of emission reducing fuels and retrofits for existing IC engines. Further, the added incentive of end users to make use of such emission reducing fuels and engine retrofits will continue to be of benefit to the oil and gas and, in fact, coal industries.

Figure 1:
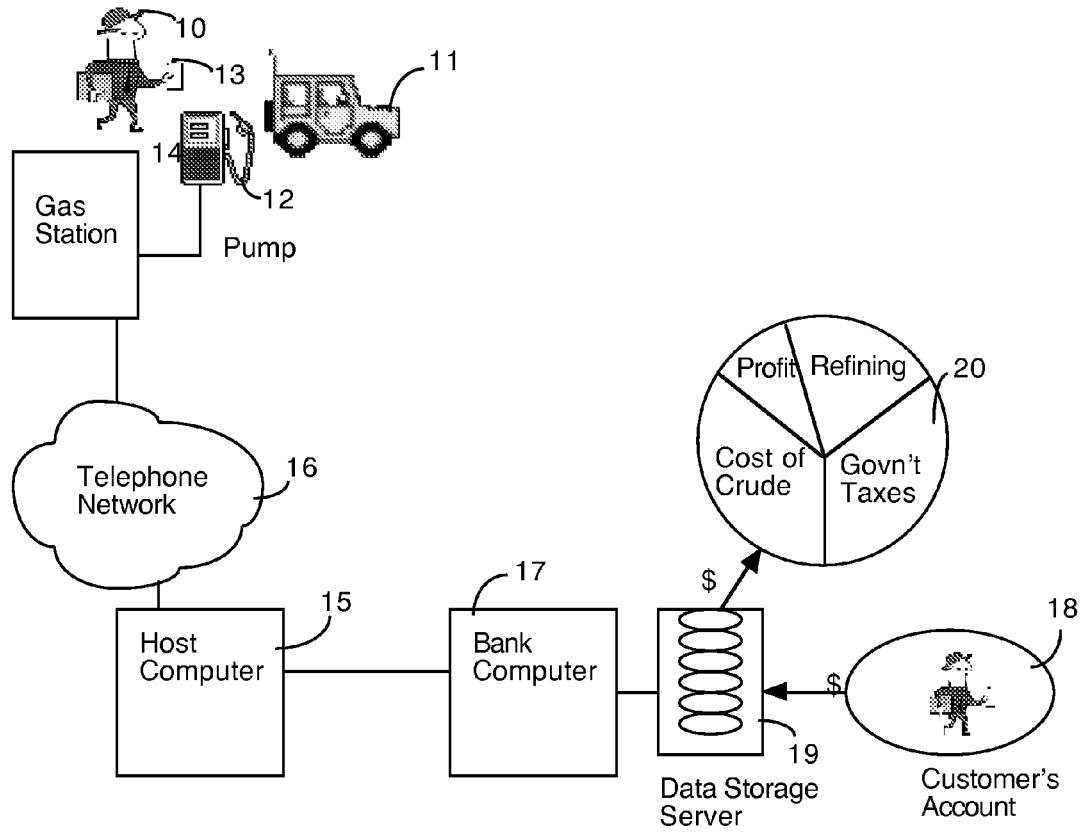
FIG. 1 is a diagram illustrating data transfer during a typical refueling transaction according to the prior art.

Referring now to FIG. 1, we have shown a block diagram illustrating refueling transaction at it occurs today. An end user 10 desires to refuel his or her vehicle 11. At the service station, a fuel pump 12 is provided with suitable means for enabling the end user 10 to pay for the refueling cost. Before starting to refuel the vehicle, the end user 10 inserts his or her credit card 13 at the fuel pump card reader 14. Once the card's magnetic strip is read, the card reader 14 activates a banking query from the service station to a host computer 15 via a telephone network 16. The host computer 15 is normally owned and managed by the oil company operating the service station and is used to authorize the start of the refueling transaction. The host computer 15 will direct the authorization query to the appropriate bank computer 17 of a banking company associated with the end user's credit card 13. The bank computer 17 verifies the validity and authenticity of the end user's credit card 13 and sends an authorization code back to the host computer 15. The host computer 15 then provides an appropriate transaction approval command either directly to the end user 10 or as is more common today, to the service station attendant, to enable end user 10 to start the refueling process of the vehicle. This approval command can be provided in the form of an audible or visual signal indicating that the pump is ready to be used.

Once the refueling process is completed, the fuel pump emits an end-of-transaction signal along with the details of the transaction to the host computer 15 and eventually to the end user's banking institution. The banking institution, having associated this transaction with the end users credit card account 18, enters the transaction details at the bank's data storage server 19. The proceeds from the transaction are then automatically credited to the various agencies 20 who share in the income generated by the sale of the fuel. The aforementioned description is provided as an example of the typical steps and transfer of data to enable a credit approved refueling transaction. It will be known to those knowledgeable in the art that such a transaction can also be done with other means, such as cash, debit card, oil company credit card, etc.

As described above, one of the goals of the present invention is to provide an emissions offset brokering system and method which will provide an incentive for end users to use more efficient petroleum based vehicles, or as in the preferred embodiment, a hydrogen retrofit kit which promote the use of hydrogen. This is achievable either by applying retrofit kits to existing IC engines as described in applicant's co-pending application, or with the use of future vehicles which will be designed to use hydrogen as their sole source of power. Modification of existing IC engines will permit the profitable transition from today's fossil-fuel-based economy towards a future hydrogen economy by encouraging the production of hydrogen as an affordable transport fuel which can optimize this invention and its co-pending application as well as its hydrogen production, distribution and fueling infrastructure while at once building consumer demand for new hydrogen vehicles as well as for ever-cleaner sources of hydrogen fuel production.

Figure 2A:
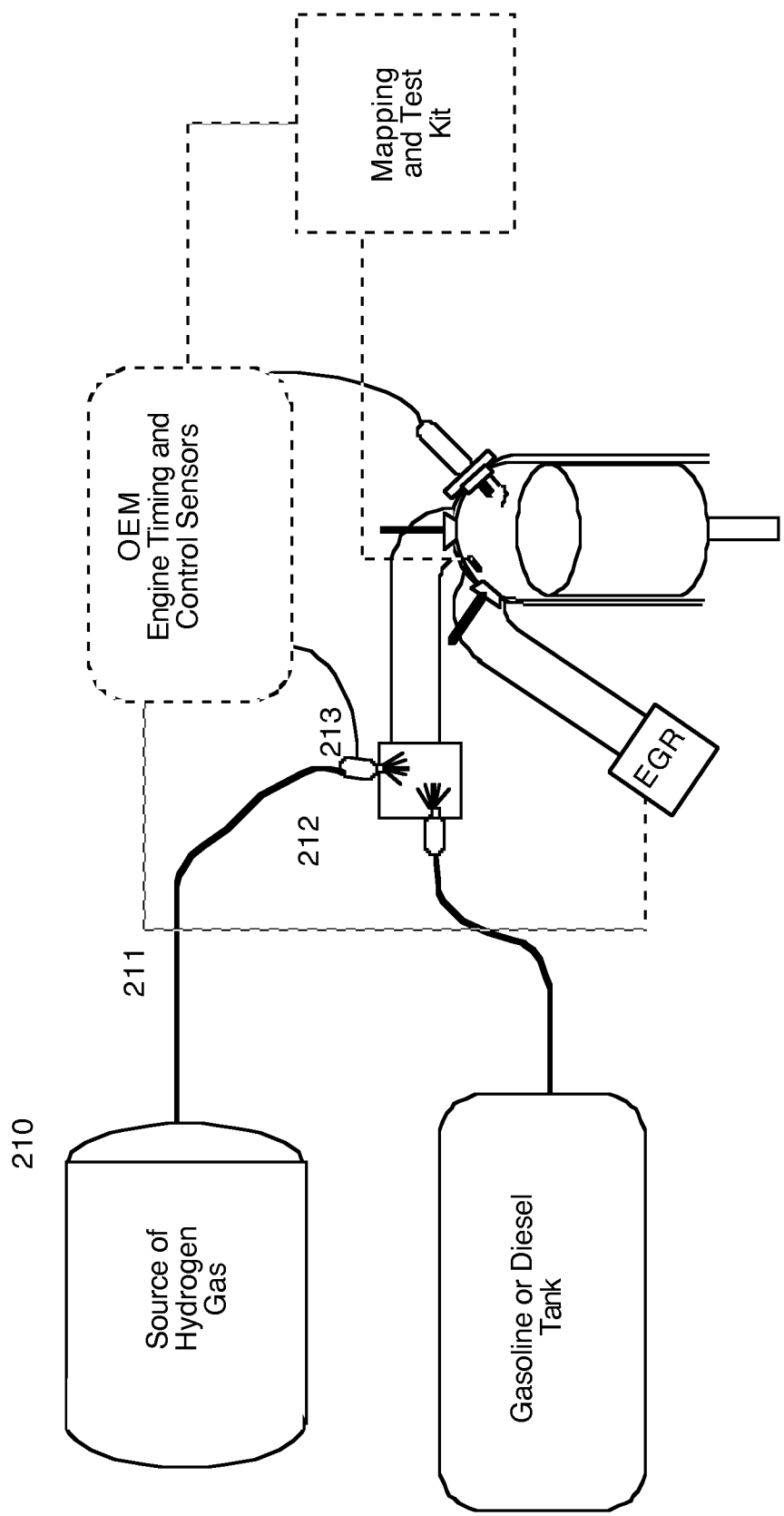
FIG. 2a is a block diagram of an engine retrofit kit, which can be used with the present invention.

In the preferred embodiment of the invention, a hydrogen retrofit kit as described in applicant's co-pending application is used to trigger such a transition. The retrofit kit enables the substitution of hydrogen for a percentage of conventional fossil fuels in certain segments of the engine's operating cycle. Applicant's retrofit system, which is illustrated in FIG. 2a, is made possible using an existing IC engine retrofitted such that a certain proportion of hydrogen gas is introduced to replace regular fossil fuel or hydrocarbons at predetermined segments of the engine's operating cycle. In order to provide hydrogen gas to the engine, a source of hydrogen 210 is installed on-board the vehicle being retrofitted, or the source of hydrogen 210 may be an onboard fuel processor or hydrogen reformer which separates hydrogen, methane and carbon monoxide (together, the constituents of syngas) from a hydrogen carrier such as an alcohol liquid fuel. Used with onboard alcohol storage, the fuel processor can generate a suitable amount of hydrogen, methane and carbon monoxide gas (syngas) mixture to be substituted for a percentage of fossil fuel.

As shown in FIG. 2a, hydrogen gas from source 210 is fed into the engine manifold 212 via a supply line 211 and injector 213. The hydrogen gas is mixed with the hydrocarbon fuel/air mixture at a predetermined level and timing according to the operating characteristics of the IC engine. The predetermined mixture and timing is derived according to a pre-set schedule or "mapping" for the type and model of engine and vehicle being retrofitted. This mapping procedure also precisely determines the amount of emission offsets earned (i.e., actual emissions reduced in the engine exhaust) from a particular quantity of hydrogen substituted for fossil fuel in that engine; for example, one tank of methanol consumed. Further details regarding the operation of the retrofit kit can be obtained with reference to applicant's co-pending patent application, which is incorporated herein by reference.

Figure 2B:
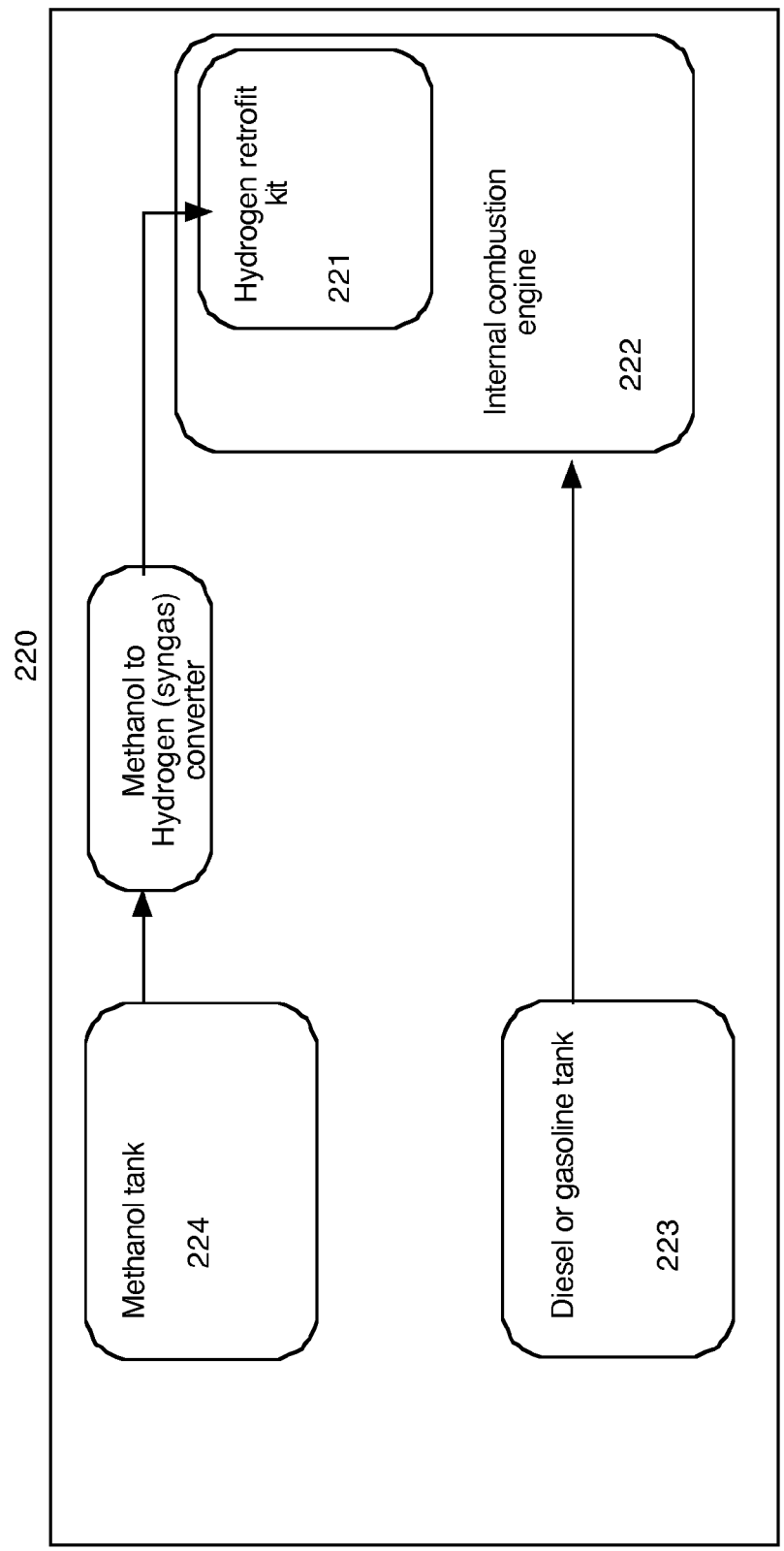

A block diagram of the fueling components of an end user's vehicle 220 having the retrofit kit is illustrated in FIG. 2b. The vehicle is provided with a hydrogen retrofit kit 221, which is installed on the vehicle's internal combustion engine 222. The existing diesel, gasoline or natural gas tank 223 is supplemented with a separate alcohol tank 224, which is used as a source of hydrogen and carbon monoxide gases. Hydrogen gas for the retrofit kit 221 is derived from the liquid alcohol via an alcohol-to-hydrogen converter or reformer 225. It will be obvious to those knowledgeable in the art that the conversion of alcohol (or other hydrogen carrier) can be performed a number of ways and need not be described in full detail at this point.

As illustrated previously, an existing IC engine can easily be retrofitted such that a certain proportion of hydrogen gas is introduced to replace regular fossil fuel or hydrocarbons at predetermined segments of the engine's operating cycle. At present, large quantities and sources of hydrogen gas that would be required to match the demand of a large number of hydrogen powered vehicles is simply not feasible. Currently, hydrogen production is limited to refineries or other large producers of petroleum based fuels such as natural gas. That is, hydrogen is not easy to distribute compared to today's most commonly used automotive fuels like diesel and gasoline. However, even though hydrogen gas cannot easily be transported or delivered to existing gasoline refueling stations, it can be derived from other sources such as ethanol, methanol, etc., which are more easily transported before its derivation (i.e., reformation into hydrogen or syngas). The preferred liquid fuel for use with the system and method of the present invention is methanol because it is readily available and generally less expensive than ethanol and is a simpler molecule to reform. Methanol, like ethanol is a hydrogen carrier that can be easily handled at ambient temperatures. Methanol is the most promising fuel in the short term since it can be stored and distributed in much the same way as gasoline is now. Both ethanol and methanol can be converted to hydrogen in a reformer.

In the case of a methanol reformer, the goal of the reformer is, with optimal efficiency, to disassociate as much of the hydrogen (H), methane and carbon monoxide (CO) as possible from the methanol (CH3OH) molecule, while minimizing the "total-cycle, well-to-wheel" added production of carbon dioxide (CO2), i.e., without a net increase in green house gases. Heat produced from methanol in the reforming process is used for the vaporization of liquid methanol and water. This mixture of methanol and water vapor is passed through a heated chamber that contains a catalyst.

As the methanol molecules hit the catalyst, they split into carbon monoxide (CO) and hydrogen gas (H2):

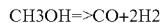

The water vapor splits into hydrogen gas and oxygen; this oxygen combines with the CO to form CO2. In this way, very little CO is released, as most of it is converted to CO2 and the balance is burned.

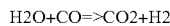

Ethanol can be reformed into H2, methane, CO and CO2 (syngas) using a similar reaction.

Another advantage to using alcohol and particularly methanol as a hydrogen carrier is that it can itself be created or derived from waste hydrogen. Today, hydrogen is flared into the atmosphere, or it may be a constituent of refinery tail gas or a byproduct of an industrial process, which is simply burnt to produce heat. These sources of hydrogen are known as waste stream hydrogen. For example, the oil industry produces 30-40% waste stream hydrogen in its refinery tail gas, which is normally burned as a source of process heat. In an ideal world, this wasted or poorly used hydrogen could be captured, cleaned and delivered to service stations for consumption in hydrogen vehicles and/or those existing vehicles with applicant's retrofit kit. Unfortunately, the transport of hydrogen requires a complex infrastructure. Because of the menagerie of problems associated with getting hydrogen to end users, very expensive and commercially as-yet-undeveloped transport and storage mechanisms are required. However, while hydrogen in its free state is very difficult to handle and transport, waste stream hydrogen can be chemically combined with carbon monoxide and heat (which are also found in tail gas) to make an alcohol such as methanol, which is easily transported. Therefore, methanol is a convenient hydrogen carrier, that doesn't threaten the oil economy, but rather, enriches it. But in order to make this transition to a future hydrogen economy, proper on-board reformer technology is required to separate methanol into hydrogen and carbon monoxide which can be substituted for fossil fuels in an IC engine.

This alcohol scenario is advantageous for the oil and gas industry. Because they are cleaning up the environment, and because hydrogen and carbon monoxide are byproducts of a highly polluting industry and which can be converted into methanol that is somewhat cleaner, these companies can earn emissions offsets (and can also make money by selling the hydrogen to other methanol producers).

The internal heat value of the hydrogen used to produce methanol can be replaced using a particular refinery's own source of pet coke. Because of its lower cost as a byproduct and its constant availability, oil companies will be incented to use pet coke rather than natural gas at the refinery front end.

Petroleum coke (pet coke) is a carbonaceous solid residual by-product of the oil refining coking process with over 60 million tons produced annually worldwide. The purpose of a "coker" is to dispose of the residual oil and increase the yield of high value light products such as gasoline and jet fuel.

There are three different types of pet coke produced, fluid, needle and delayed, which account for almost all of the world's pet coke production. Over 75% of the pet coke produced is considered to be fuel grade and has about 15% higher heating value than high grade coal.

One of best ways to make hydrogen is to use water and pet coke. With this process, hydrogen and CO can be derived. Byproduct hydrogen is then spun off to methanol.

Thus, methanol is the preferred choice as a carrier (i.e., transporter) of hydrogen since it is relatively abundant, and it can be easily moved in liquid form and with on-board reformer technology, can be converted to hydrogen very efficiently.

Another advantage of methanol is that it does not require the creation of a new transportation infrastructure. Oil companies can make money from the sale of methanol and will not be threatened by the loss of sales of diesel or gasoline. A further advantage to using methanol is that unlike gas or diesel, methanol can be produced from biomass. Alcohols can be produced from many biomass sources, so a methanol production facility can be located with flexibility. If alcohols are produced from biomass, very few net emissions go into the atmosphere. Methanol is a transitional fuel, which can help to build new infrastructure for production, storage and distribution of pure hydrogen in the future.

It should be noted that the following description makes reference to a hydrogen carrier. The use of the term hydrogen carrier is meant to encompass any source of hydrogen as the engine fuel. Thus, a hydrogen carrier can take many forms like liquid alcohol fuels, such as ethanol or methanol and can be used interchangeably.

Figure 3:
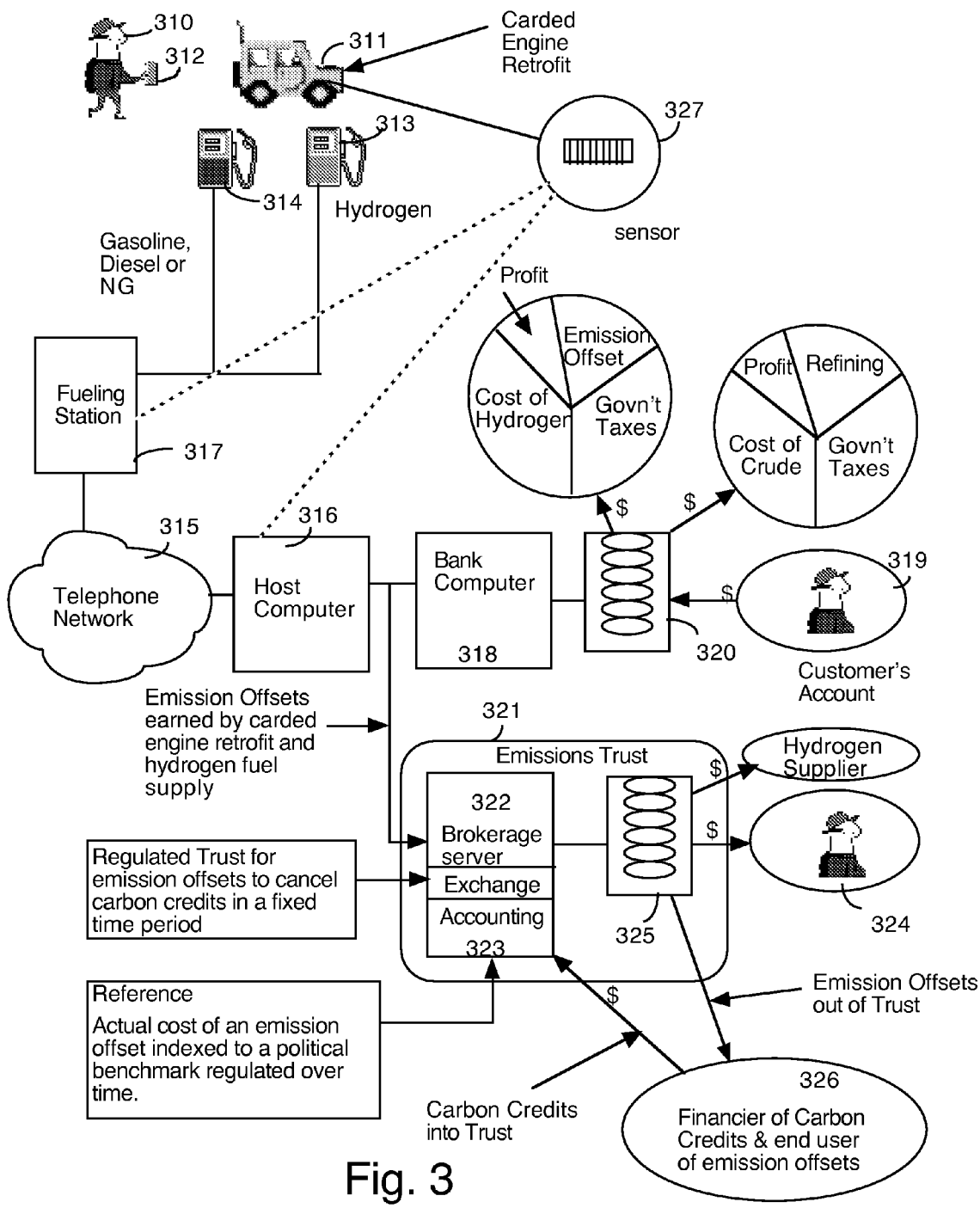
FIG. 3 is a block diagram illustrating a refueling transaction with brokering system of the present invention.

Referring now to FIG. 3, we have shown a block diagram illustrating a refueling transaction for an end user or operator 310 of a vehicle 311 provided with a hydrogen retrofit kit. Upon the installation or acquisition of a vehicle 311 having a retrofit kit, the end user 310 is provided with an identification or validation card 312, which is used by the operator, end user or owner of the retrofitted vehicle 311. This validation card may also be a simple credit card that is identified by means of its magnetic strip or digits to the credit system to associate its end user with the brokerage system and method of the present invention. This unique card 312 associates that end user 310 with that particular retrofitted vehicle 311. Each time the card 312 is used, it will a) identify the owner, end user or operator as an emission offset producer; b) link the emission offset producer to a specific type and model of retrofitted vehicle which either has a source of hydrogen on board or is able to convert methanol or another alcohol or hydrogen carrier into hydrogen on board the vehicle; and c) provide the operator with access to dedicated hydrogen (methanol) fueling stations or pumps 313 in addition to the standard gasoline, diesel or natural gas pumps 314. This unique credit card 312 is to be provided by an emissions offset brokerage firm, which in cooperation with a hydrogen carrier supplier such as an oil company, can trigger a market for a hydrogen economy. Similarly, the issuance of such a card could also be provided via that oil company's credit division, a car manufacturer in association with a oil company, a government organization, etc. An example of such credit cards would be those that currently exist for fueling stations or card locks which use a card (similar to a credit card or a card with a magnetic strip) to access the dispenser and allow fuel to flow into the vehicle's fuel-storage tank(s). These are mostly used with storage facilities in connection with sales at unattended and attended locations through use of a meter system maintained and controlled by a supplier licensed for such purposes. With the use of the card issued to the user, a computerized system maintains accurate records of such sales. It should be noted, that utilization tracking of the end user's vehicle could be done via a recording sensor in order to derive the emissions offset associated with the vehicle over a certain period of time. Information on the sensor could be downloaded at periodic intervals to determine how much the vehicle's end user should receive for the emissions offset trading.

Although FIG. 3 shows separate methanol and gasoline/diesel fuel pumps, other pump delivery systems exist to enable the end user 310 to fuel his or her vehicle with different types of fuel while using separate pump nozzles. Those operators carrying the unique credit card or card lock receive a discount from the full price of diesel, gasoline or natural gas (fossil fuel). This discount is such that the combination of, say, 70% of a liter of fossil fuel together with 30% of a liter of hydrogen, all on a calorific basis, is less than or equal to the regular price of a full liter of fossil fuel only.

Once the end user swipes the card 312 at the hydrogen carrier pump 313, a data connection is made via the telephone network 315 to various network computers to enable the completion of the fueling transaction.

An authorization host computer 316 such as an HP9000, which is operated by the owner or operator of the fueling station 317 is used to authorize or deny transactions as cards are swiped at the pump to request fuel purchases.

A bank computer 318 is used to authorize, provide and monitor the exchange of funds between the seller's account (not shown) and the end user's account 319. A database 320 can be used as part of a monetary transaction system to enable the proper distribution of income. In the case of the purchase of gasoline or diesel, the income will be distributed to the seller for the cost of the crude oil, the marketing costs, refining costs and profit. A portion is also allocated to the various government levels who collect a tax on the consumption or purchase of the gasoline or diesel. In the case of the purchase of hydrogen 313 (via whatever carrier is used), the income will be distributed among taxes, emission offsets, cost of hydrogen and profit.

With the present invention, as the operator re-fills the hydrogen carrier tank on his or her vehicle 311, the transaction is monitored separately by an emissions trust 321 as it results in the creation of emission offsets generated for the operator or end user 310 by the retrofitted vehicle 311 and the hydrogen fuel 313 according to an original engine "map" developed and certified for the retrofit. With the system of the present invention, when authorization host computer 316 identifies that a validation card lock 312 is being authorized, data for that transaction is provided to a brokerage server 322 via the host computer 316. The brokerage server 322 makes use of an accounting computer 323 for the accounting of the sale of hydrogen for each end user's transactions. With each purchase of hydrogen, the brokerage server 322 and in particular the accounting host 323, calculates an amount of emission offsets to be credited to the end user account 324. The emissions offset accounts are kept by the brokerage server in a database 325.

Collected emissions offsets are used and marketed as a commodity between buyers and sellers. In some instances, these emissions offsets can be sold for cash by the end user 310 to a government organization or these can be acquired, in exchange for a service fee by the emissions trust 321. For example, upon fueling with hydrogen, the end customer 310 could request the emissions trust 321 to automatically exchange the acquired emissions offsets to cash for deposit in his or her account 324. As this scenario illustrates, the end user receives an incentive from a) the lower cost of refueling his or her vehicle and b) the receipt of emission offsets convertible to cash.

Once exchanged, the emissions trust can re-sell the acquired emissions offsets to financiers of emission credits and those buyers who require emissions offsets 326. Buyers of emissions offsets 326 use these to 'offset' carbon credit penalties. The funds used for purchasing these emissions offsets, are then transferred to a trust account managed by the emissions trust 321. A regulated trust is used for emissions offsets to cancel carbon credits in a fixed time period. This is achieved by monitoring a reference index (similar to an international currency exchange) wherein the actual cost of emissions offset indexed to political benchmark is regulated over time.

Although the preferred embodiment makes use of a validation or authorization card to trigger the collection of emissions offsets for the operator of the vehicle, other collection means can be used. For example, in another embodiment, an engine sensor collects information regarding the operating parameters of the engine along with the fuel consumption. The operator can at predetermined service centers arrange for the download of this information. The information could be transferred directly to a storage server 322 of an emissions trust 321. The funds associated with the creation of the emissions offsets can then be provided to the end user or vehicle operator's account 324.

The benefits of the method and system of the present invention can be quite substantial. Let's take for example, an operator/owner of a Class 8 highway truck, operating 150,000 km/year. Typically, such a truck runs a 400 horsepower diesel engine and consumes about one half liter of diesel per kilometer traveled. For reference, the cost today of fuel to operate such a vehicle is approximately $56,000/year with diesel priced @ $0.75/liter.

This same truck operating the same annual route with a retrofit kit burning 30% hydrogen (calorific equivalent of diesel fuel) would reduce its net annual emissions by a concomitant 30%. In a typical 400 hp diesel truck, this would amount to a reduction of greenhouse gas and critical air contaminants totaling 90 tonnes annually. (Note that overall emissions in today's average retrofitted engine will be reduced by an amount in excess of 50% and may exceed 75% when more efficient engine technology and control systems become available on future OEM vehicles—which will then be tomorrow's "existing vehicles".)

This gas emissions reduction will be referenced to an index 323 that has calculated the actual cost to reduce a quantity of emissions and an emissions offset will be issued 326 for this reduction. This emissions offset has been earned by the owner of the vehicle having the hydrogen retrofit kit 311 and the card that purchased the hydrogen fuel for that vehicle (i.e., the carded engine retrofit). Accordingly, this earned emissions offset can now be exchanged for cash in the amount that the market will bear for the contribution of that emissions offset towards a cleaner global atmosphere.

As any marketplace needs both a seller and a purchaser, the emissions offset must be bought by an entity that has a requirement for clean air; namely, an entity that has an obligation to reduce emissions but, will not (or cannot) at that time, accomplish such an obligatory reduction. This entity will, instead, purchase an emissions offset from a carbon credit financier 326 which has access to the emissions trust 321 and which will give the entity the right to continue to pollute (i.e. to create carbon credits) at a certain level for a certain time.

The purchase of this emissions offset finances the transaction with the bulk of the cash going to the seller; i.e., the owner of an emissions offset that has been produced in a retrofitted existing IC engine. In this manner, a truck that was polluting at 100% reference capacity before the retrofit can generate 30% of that capacity in emission offsets to cancel equivalent carbon credits originally created by an entity that could not fulfill a legal obligation to reduce its own emissions.

The net result for the truck owner/operator who in this example reduced emissions by 30% will be additional income; from the offsets purchased through the emissions trust. Moreover, upon installation of the engine retrofit, that income will be fixed for the remaining life of the vehicle. A portion of this fixed amount of income will be added to the value of the truck when it is traded because the yet-to-be-produced emission offsets will accrue to the new owner of the retrofitted truck.

In this example additional emission offsets per truck per year may be earned by the supplier of hydrogen fuel whether pure hydrogen or in the form of alcohol or other hydrogen carrier.

This brokering method provides an economic incentive for both the truck owner and the supplier of hydrogen to partner with the provider of the retrofit technology and the emissions trust. The trust will broker optimized emission offset values by breaking the total emissions produced into emission constituents such as CO2, NOx and particulates.

Even in its simplest form, the brokering method can be applied for example to the current sale of ethanol blended fuels. The vehicle owner could receive an emissions offset, albeit at a lower level than, say, an owner of a hydrogen retrofitted vehicle, but still of sufficient amount to entice the owner to continue to use ethanol blended fuels, as this use helps to reduce emissions. One can take this further by helping promote the purchase of more fuel-efficient vehicles, even if these still operate with fossil fuels. The size of the emissions offset received at the pump by the owner would be based on the level of fuel efficiency provided by the vehicle relative to other vehicles in its class having less energy efficiency.

Thus, those vehicles which operate using hydrogen retrofit kits would receive a higher quantity of emission offsets than new vehicles which continue to use fossil fuels, even if these new vehicles are more recent fuel efficient models.

Emission Offsets From engine Mapping

Figure 4:
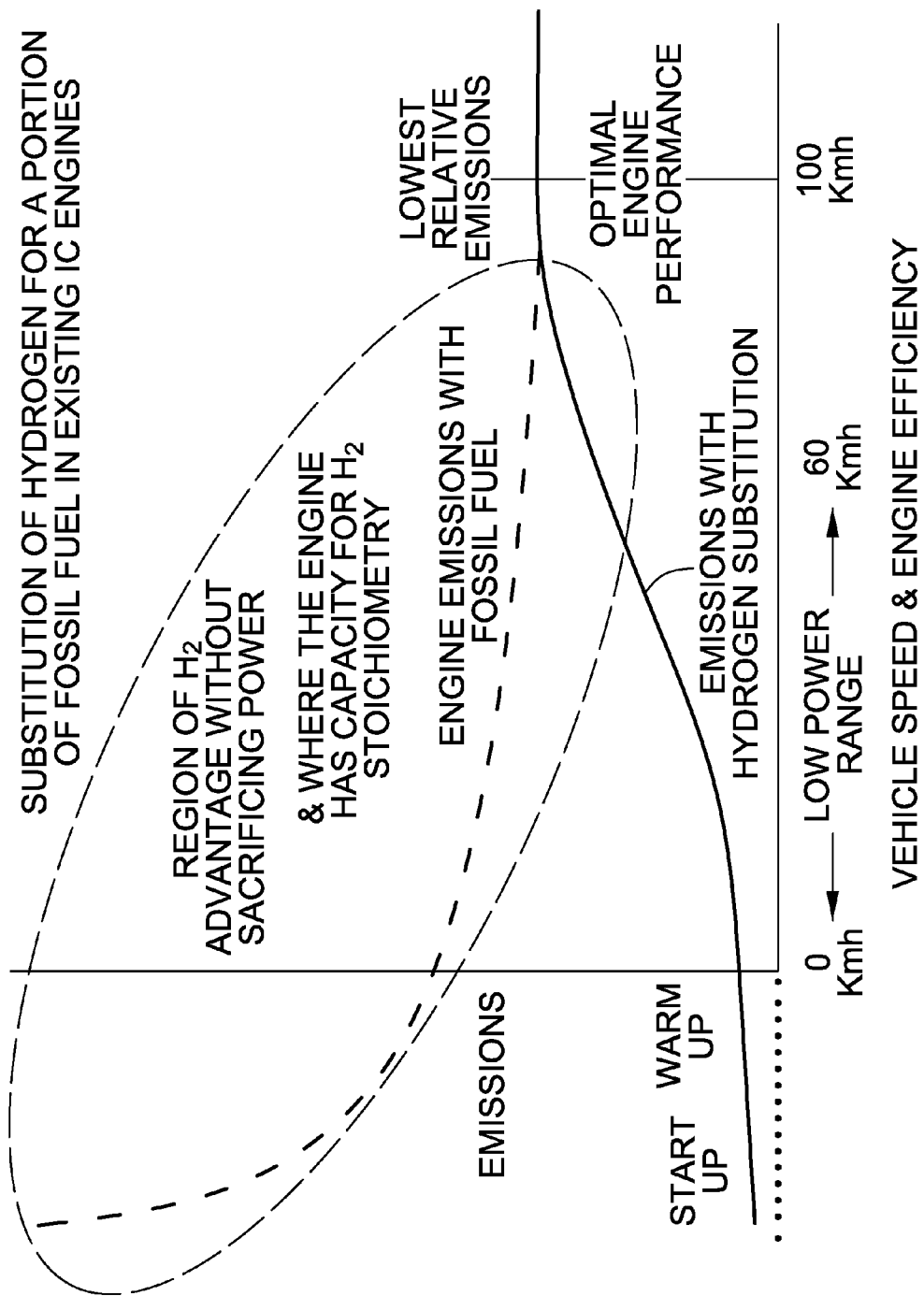
FIG. 4 is an illustration of an engine's operating curve against the level of emissions with hydrogen substitution.

FIG. 4 illustrates the concept of hydrogen substitution using applicant's methodology to apply hydrogen fuel to an existing internal combustion engine. As indicated previously, applicant described the ability to substitute hydrogen for a proportion of fossil fuel during certain segments of the engine's operating cycle without affecting prescribed OEM engine performance, longevity and warranty criteria and without technically invading the engine. Of paramount importance is that the engine's existing sensors, electronic control and fuel management systems are utilized when applying hydrogen either as a dual fuel or as a separate fuel while maintaining the exact same engine performance originally demanded by the OEM except with dramatically reduced emissions.

FIG. 4 shows an "emissions vs. vehicle speed and engine efficiency" curve which can be altered (i.e., emissions can be lowered by the addition of hydrogen) only within the oval area indicating the "region of leveraged hydrogen advantage". Notably, when engine performance outside that region is demanded by the operator, the engine must revert within a microsecond to operate flawlessly on its originally prescribed fossil fuel. It must be underscored that nothing can be added to, or taken away from, the existing engine's operating systems; these systems can only be interfaced with hardware and software external to the engine that facilitates hydrogen to be applied within the oval area while using the same OEM engine systems which may be demanded within a microsecond for severe engine performance (eg., for safety or power). A low capital cost while keeping the engine retrofit and its emission offsets trading system commercially viable is thereby accomplished.

Figure 5:
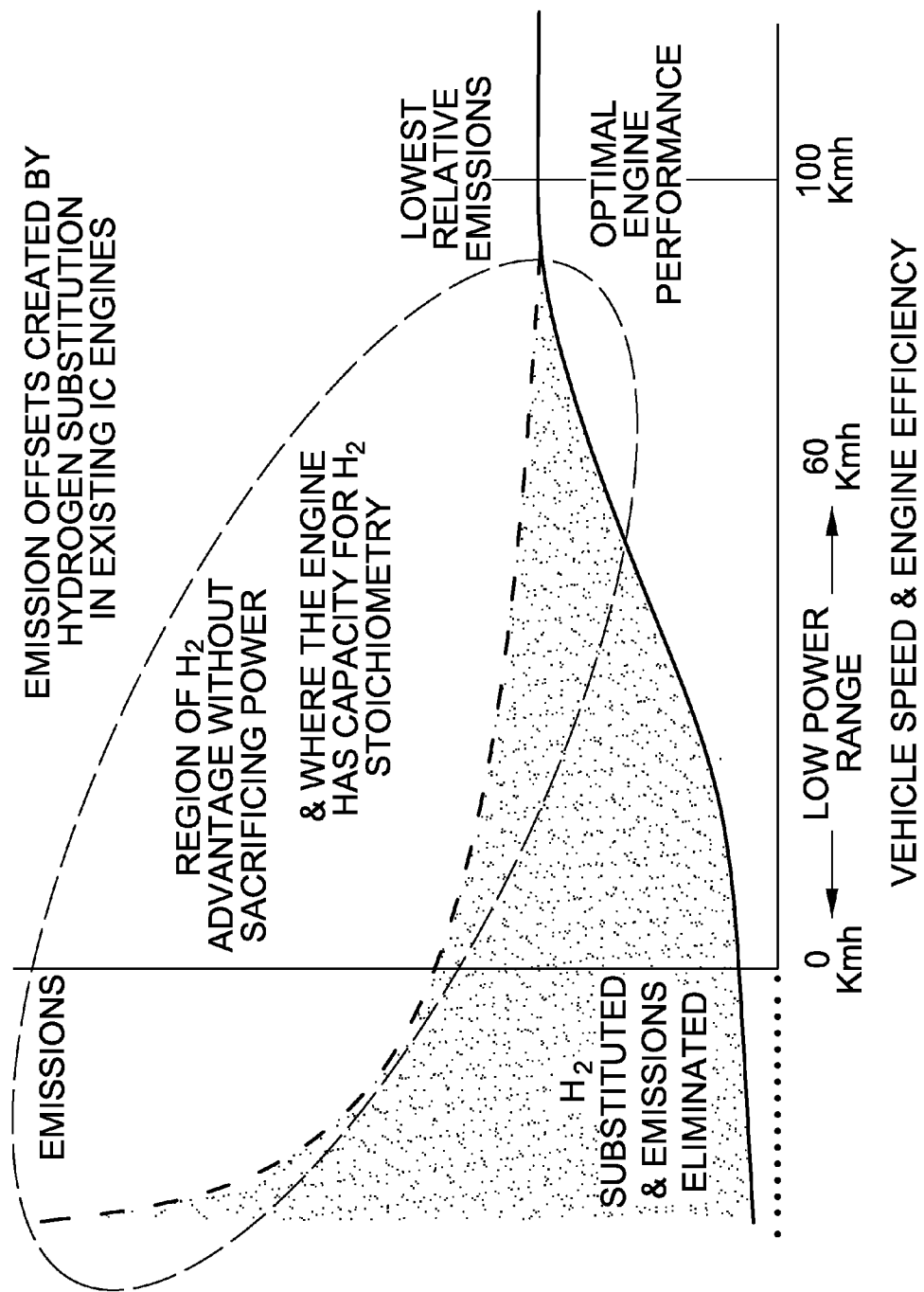
FIG. 5 is FIG. 4 adjusted to illustrate elements of both hydrogen substitution and emission offsets.

FIG. 5, is a progression of FIG. 4 after application of hydrogen inside the oval region of leveraged hydrogen advantage. FIG. 5 illustrates the mapping of an engine's operating parameters and then uses that map to discretionarily substitute hydrogen for a proportion of fossil fuel to significantly reduce emissions without any change whatsoever in the engine's operating characteristics or performance: which produces and uses the engine map to confirm, quantify and monetize emission offsets.

FIG. 5 shows the emissions reduction in a retrofitted engine. The area between the upper performance curve of a non-retrofitted engine and the hydrogen-produced lower performance curve after retrofit is the quantity of emissions that is no longer there (i.e., emissions offsets) in a retrofitted engine operating in identical conditions with hydrogen substituted according to the prescription of the engine map. In particular, FIG. 5 shows an area between the upper and lower curves as a calculation of emissions offsets earned and traded for cash during perhaps fifteen minutes of an engine's partial operation on hydrogen fuel from startup to highway cruising speed.

FIG. 5 shows that the region of leveraged hydrogen advantage can be extended considerably into the area of higher vehicle speed. The significance of this broader range of hydrogen substitution is that, as newer IC engines are developed and marketed by OEMs, the engine and fuel management systems and sensors will become more sophisticated and accurate along with new microprocessor-controlled mechanical advances such as variable valve capacity and perhaps even variable piston/cylinder capacity in the future. These technical and managerial engine advancements will improve parts of engines, which will accept higher proportions of hydrogen substitution.

The implication of new engine technology and applicant's method of engine mapping for hydrogen substitution should continue with increasingly higher proportions of hydrogen which will be substituted for fossil fuels in future engines. A growing hydrogen marketplace with ubiquitous hydrogen fueling infrastructure economically driven by fungible emission offsets created in today's IC engines will ultimately result in tomorrow's vehicles that burn 100% hydrogen fuel in a likely combination of IC engines and hybrid electric technologies, possibly including fuel cells.

In other words, applicant's system and method as applied to existing or future IC engine, in accordance with FIG. 4 and FIG. 5, will create a hydrogen marketplace. This can be sustained by the income that consumers will make by selling emission offsets earned from substituting hydrogen for fossil fuels in existing engines. This economic incentive for consumers will financially underpin the introduction of zero emissions hydrogen production, distribution and fueling infrastructure without incursion of stranded investment by automotive OEM's, energy companies, financiers or, in particular, consumers.

The logic for determining the emission offsets produced in an existing engine as shown in FIG. 5 can be described as follows:

1. A number of OEM engines of identical type and model are randomly selected and tested in vehicles under varying driving conditions. Data is averaged and then integrated with OEM engine performance curves such as "pressure vs. volume", "crank angle vs. mean pressure", "heat release rate vs. crank angle" and "peak combustion pressures vs. hydrogen substitution rate", which are regenerated by the same engine type and model operating on a dynamometer that simulates the original driving conditions while referencing data such as engine RPM, vehicle speed, injection timing, engine and exhaust temperatures, oxygen level and manifold air pressure. Also recorded is the emissions data from an exhaust aftertreatment system, whether OEM installed or incorporated as part of the retrofit. Total engine emissions produced by the fossil fuel prescribed for that particular engine type and model are recorded during the entire test procedure. This data is Record A and is represented by the emissions curve in FIG. 4, which is also the upper emissions curve in FIG. 5.

2. Hydrogen is then substituted in the engine according to FIG. 4 and FIG. 5. in such manner and quantity that the engine and vehicle performs exactly as if it were burning its prescribed fossil fuel as tested in 1, above in order to generate a "hydrogen fuel consumption vs. emissions reduction" reference curve for that engine. Where an exhaust after-treatment system is not part of the OEM package, an after-treatment system is incorporated, components of which use hydrogen as a reductant. Total engine emissions produced by the substitution of hydrogen in place of the prescribed fossil fuel for that particular type and model are recorded during the entire test procedure. This data is Record B and is represented by the lower emissions curve in FIG. 5.

3. As shown in FIG. 5, Record A minus Record B equals the quantity of emission offsets generated with reference to only hydrogen fuel consumption and engine performance over time.

4. A retrofit kit is manufactured for that specific type and model of existing OEM engine and is applied in accordance with FIGS. 1, 2a, 2b, 3, 4 and 5 without invading the engine. A retrofit kit engine sensor interfaces with an emissions trading and hydrogen fueling credit card by telephone and telematics. The retrofit kit engine sensor also interfaces with the OEM engine sensors, microprocessors and fueling system, government regulated credit card and banking systems as well as with international carbon trading systems which are currently under development.

5. Integral parts of the retrofit kit engine sensor and its interfaces for emissions trading in existing IC engines, are the algorithms mapped to engine temperature, efficiency and NOx emissions vis-a-vis hydrogen substitution. FIGS. 4 and 5 indicate the area of engine operation in which optimal hydrogen performance and leveraged emission benefits are obtained while maintaining the power of conventional fuels, but while approaching the emissions level of a hydrogen-only vehicle. While adding hydrogen does not compromise engine efficiency, it can reduce optimal power in an existing engine originally designed to operate on another fuel. However, this is not the case with the IC engine retrofit and emissions trading technologies represented by FIGS. 4 and 5 because where hydrogen is needed most for emissions reduction (i.e., startup, warm up and low speed), is where engine capacity and hydrogen stoichiometry have the most latitude to improve combustion, and to do so without sacrificing power or performance. While this is the economic force behind non-invasive IC engine retrofit and emissions trading technologies, one critical emissions phenomenon that is independent of the type of fuel used must still be addressed, and that is the reduction of NOx formed in the presence of excess oxygen at high cylinder temperatures. When combustion temperatures in conventional internal combustion engines are raised for extended periods, one common method of reducing NOx is to intermittently lower the cylinder temperature by exhaust gas recirculation (EGR). EGR reduces oxygen, which results in lower engine temperature and, therefore, reduced NOx production (significantly, this is accomplished without tampering with the optimal setting of advanced ignition timing); on the other hand, optimal combustion of hydrogen requires excess oxygen to produce the highest and most desirable cylinder temperature and pressure and consequently produces the most efficiency, best performance and highest fuel economy—but, predictably, this optimized hydrogen combustion at high cylinder temperature also produces increased NOx emissions. This enigma is resolved in FIGS. 4 and 5 by the judicious use of only a portion of hydrogen relative to the amount of oxygen present at any instant of time. This increases engine efficiency and reduces overall emissions, and most importantly, it limits the level of oxygen so as to lower NOx production. This is accomplished by monitoring engine and exhaust conditions with existing sensors. The information is then used to "trade off" conventional fossil fuels with hydrogen applied at the cylinder in order to achieve cleaner, more efficient combustion. Hydrogen is also applied in exhaust after treatment including EGR and/or selective catalytic reactor (SCR) systems. This process is convenient and inexpensive because one single variable on-board source of hydrogen can be applied with discretion to either or to both, the cylinder and after treatment systems at any particular time, but not all of the time. The result is a leveraged reduction in emissions vis-a-vis the quantity of hydrogen employed (i.e., even when hydrogen cannot be substituted inside the cylinder, it can still be applied in after treatment when the engine is functioning fully on its normal fuel). Conversely, when the largest relative quantity of hydrogen is being applied at lower rpm (i.e., at start up, idle or low speed driving), the engine is not producing the high manifold heat normally needed for exhaust after treatment; however, in this mode of engine operation there is a priori no requirement for after treatment because the large portion of hydrogen being burned results in virtually no GHG or CAC emissions and, particularly, no NOx because the low cylinder temperature precludes nitrogen from combining with oxygen. In this manner, NOx that would otherwise be produced for the remaining useful life of the engine is eliminated and, in the manner described in the previous section, the originally mapped emission offsets data can be tallied and exchanged for cash.

What is claimed is:

1. A non-transitory tangible computer readable storage medium having stored thereon a computer program for implementing a system for determining emissions offset credits associated with the consumption of environmentally cleaner non-petroleum fuels in an environmentally cleaner vehicle designed to obtain all of its automotive power through consumption of a petroleum fuel and which has been retrofitted to obtain at least a portion of its automotive power through consumption of at least one of the environmentally cleaner non-petroleum fuels, the computer program comprising a set of instructions which, when executed by a computer, cause the computer to perform a method comprising the steps of:

obtaining an identifier to associate a refueling action with a user of the environmentally cleaner vehicle or with the environmentally cleaner vehicle; and accessing a database containing data entries to record creation of emissions offset credits for the user of the environmentally cleaner vehicle or for the environmentally cleaner vehicle based on the identifier, the emissions offset credits being calculated by comparing an amount of petroleum based fuel used to provide automotive power to the environmentally cleaner vehicle after being retrofitted to obtain at least a portion of the automotive power through consumption of the at least one of the environmentally cleaner non-petroleum fuels with an estimated amount of petroleum based fuel that would have been required to provide equivalent automotive power to the environmentally cleaner vehicle in its original designed condition.

2. The non-transitory tangible computer readable storage medium of claim 1, wherein said database forms part of an emissions trust system for crediting and debiting emissions offset credits.

3. The non-transitory tangible computer readable storage medium of claim 2, wherein said emissions trust system includes a brokerage server, accessible to credit brokers for the trade of emissions offset credits.

4. The non-transitory tangible computer readable storage medium of claim 3, wherein said brokerage server is debited of emissions offset credits and traded against emission credits by said credit broker.

5. The non-transitory tangible computer readable storage medium of claim 1, wherein the entries in the database are associated with the user of the vehicle, the emissions offset credits are owned by and exchangeable by the user of the vehicle, and creation of emission offset credits triggers a discounted re-fueling charge for said user.

6. The non-transitory tangible computer readable storage medium of claim 1, wherein a level of emissions offset credits created is related to a fuel efficiency level of the environmentally cleaner vehicle.

7. The non-transitory tangible computer readable storage medium of claim 1, wherein said environmentally cleaner vehicle is provided with an internal combustion engine designed to obtain all of its automotive power through consumption of diesel fuel and which has been retrofitted to obtain all of its automotive power through the consumption of a combination of hydrogen and diesel fuel;

wherein the emissions offset credits are calculated by comparing an amount of diesel fuel used to provide automotive power to the environmentally cleaner vehicle after being retrofitted to obtain at least a portion of the automotive power through consumption of the combination of hydrogen and diesel fuel with an estimated amount of diesel fuel that would have been required to provide the equivalent automotive power to the environmentally cleaner vehicle if a portion of the automotive power had not been obtained through the consumption of hydrogen.

8. The non-transitory tangible computer readable storage medium of claim 7, wherein said identifier is a validation card configured to activate a re-fueling pump providing a hydrogen carrier fuel.

9. The non-transitory tangible computer readable storage medium of claim 8, wherein said hydrogen carrier fuel is an alcohol based fuel.

10. A computer implemented method of determining emissions offset credits associated with the consumption of environmentally cleaner non-petroleum fuels, the method comprising the steps of:

during a re-fueling action, receiving by a first computer maintained database, an identifier number associated with a validation card, the validation card being associated with a user of an environmentally cleaner vehicle;

accessing, by the computer, a list of users in the first computer maintained database, the first computer maintained database containing a data entry correlating the identification number associated with the validation card and the user of the environmentally cleaner vehicle; and correlating, by the computer in the first computer maintained database, entries recording events associated with creation of emissions offset credits with the data entry for the user, the emissions offset credits being credited to the user of the vehicle and related to automotive driving operation of the environmentally cleaner vehicle;

wherein the computer is configured to calculate the emissions offset credits by comparing an amount of petroleum based fuel used to provide automotive power to the environmentally cleaner vehicle after being retrofitted to obtain at least a portion of the automotive power through consumption of the at least one of the environmentally cleaner non-petroleum fuels with an estimated amount of petroleum based fuel that would have been required to provide equivalent automotive power to the environmentally cleaner vehicle in its original designed condition.

11. A method as defined in claim 10, further comprising crediting and debiting emission offset credits at said second database.

12. A method as defined in claim 11, wherein said second database forms part of an emissions trust for crediting and debiting emissions offset credits.

13. A method as defined in claim 12, further comprising trading said emissions offset credits at said emissions trust via a brokerage server, accessible to credit brokers for the trade thereof.

14. A method as defined in claim 13, wherein the user is the driver of the vehicle, the method further comprising the step of discounting re-fueling charges for said driver when said events associated with the creation of emission offset credits are triggered.

15. A method as defined in claim 10, wherein a level of emissions offset credits created is related to a fuel efficiency level of the environmentally cleaner vehicle in an altered form relative to an expected fuel efficiency level of the environmentally cleaner vehicle in an unaltered form.

16. A method as defined in claim 10, wherein said environmentally cleaner vehicle is provided with an internal combustion engine designed to obtain all of its automotive power through consumption of diesel fuel and which has been retrofitted to obtain all of its automotive power through the consumption of a combination of hydrogen and diesel fuel wherein the emissions offset credits are calculated by comparing an amount of diesel fuel used to provide automotive power to the environmentally cleaner vehicle after being retrofitted to obtain at least a portion of the automotive power through consumption of the combination of hydrogen and diesel fuel with an estimated amount of diesel fuel that would have been required to provide the equivalent automotive power to the environmentally cleaner vehicle if a portion of the automotive power had not been obtained through the consumption of hydrogen.

17. A method as defined in claim 16, further comprising said validation card activating a re-fueling pump providing a hydrogen carrier fuel.

18. A method as defined in claim 17, wherein said hydrogen carrier fuel is an alcohol based fuel.

19. A method as defined in claim 10, wherein the value of the emissions offset credits are set by an emissions index.

20. A system for determining emissions offset credits associated with the automotive driving operation of an environmentally cleaner vehicle, comprising:
an engine sensor configured to capture automotive driving operation utilization information of an environmentally cleaner vehicle; and
database entries storing events associated with the automotive driving operation utilization information captured by said engine sensor, said events enabling emissions offset credits associated with the automotive driving operation of said environmentally cleaner vehicle to be determined;
wherein the emissions offset credits are calculated by comparing an amount of petroleum based fuel used to provide automotive power to the environmentally cleaner vehicle after being retrofitted to obtain at least a portion of the automotive power through consumption of the at least one of the environmentally cleaner non-petroleum fuels with an estimated amount of petroleum based fuel that would have been required to provide equivalent automotive power to the environmentally cleaner vehicle in its original designed condition.

21. A system as defined in claim 20, wherein said emissions offset credits are determined by comparing automotive operating parameters captured by the engine sensor with historical automotive operation parameters of the vehicle prior to being retrofitted under identical operating conditions.

22. A system as defined in claim 21, wherein the value of said emissions offset credits are calculated according to a reference associated with a regulated emissions offset credits index.

23. A system as defined in claim 22, wherein said second database forms part of an emissions trust system for crediting and debiting emissions offset credits.

24. A system as defined in claim 23, wherein said emissions trust system includes a brokerage server, accessible to credit brokers for the trade of emissions offset credits.

25. A system as defined in claim 21, wherein said environmentally cleaner vehicle is provided with an internal combustion engine designed to obtain all of its automotive power through consumption of diesel fuel and which has been retrofitted to obtain all of its automotive power through the consumption of a combination of hydrogen and diesel fuel, wherein the emissions offset credits are calculated by comparing an amount of diesel fuel used to provide automotive power to the environmentally cleaner vehicle after being retrofitted to obtain at least a portion of the automotive power through consumption of the combination of hydrogen and diesel fuel with an estimated amount of diesel fuel that would have been required to provide the equivalent automotive power to the environmentally cleaner vehicle if a portion of the automotive power had not been obtained through the consumption of hydrogen.

26. A system as defined in claim 20, wherein said events associated with the creation of emission offset credits triggers a discounted re-fueling charge.

27. A system as defined in claim 26, wherein said brokerage server is debited of emissions offset credits and traded against emission credits by said credit broker.

28. A system as defined in claim 27, wherein a level of emissions offset credits created is related to a fuel efficiency level of the environmentally cleaner vehicle in an altered form relative to an expected fuel efficiency level of the environmentally cleaner vehicle in an unaltered form.

* * * * *